United States Patent

[11] 3,601,063

| [72] | Inventor | Albert G. Dean<br>Narberth, Pa. |
|---|---|---|
| [21] | Appl. No. | 835,698 |
| [22] | Filed | June 23, 1969 |
| [45] | Patented | Aug. 24, 1971 |
| [73] | Assignee | The Budd Company<br>Philadelphia, Pa. |

[54] COMPOUND RAILWAY SPRING ASSEMBLY
3 Claims, 2 Drawing Figs.

[52] U.S. Cl. .................................................. 105/199 R,
105/197 B, 105/453, 267/3, 267/4
[51] Int. Cl. ........................................................ B61f 1/14,
B61f 5/04, B61f 5/10
[50] Field of Search ......................................... 105/141,
197, 199, 197 B, 199 R, 453; 267/3, 4

[56] References Cited
UNITED STATES PATENTS

| 2,908,230 | 10/1959 | Dean | 105/182 R |
| 811,622 | 2/1906 | Downer | 105/197 |
| 2,896,551 | 7/1959 | Lich | 105/199 |
| 3,012,521 | 12/1961 | Lich | 105/141 |
| 3,045,998 | 7/1962 | Hirst | 267/3 |
| 3,262,693 | 7/1966 | Hirst | 267/3 |
| 3,361,087 | 1/1968 | Dean | 105/199 X |
| 3,491,702 | 1/1970 | Dean | 105/199 |

*Primary Examiner*—Arthur L. La Point
*Assistant Examiner*—Howard Beltran
*Attorneys*—Thomas I. Davenport, Edward M. Farrell, John D. Sowell, Alford L. Trueax, Jr. and William R. Nolte

ABSTRACT: Air spring apparatus including a metal housing with an elastomer shear ring sealing a reserve air volume in the body bolster of a vehicle. The air spring is arranged in series with a coil spring which has an elastomeric bumper pad and is supported on a truck bolster.

Patented Aug. 24, 1971
3,601,063
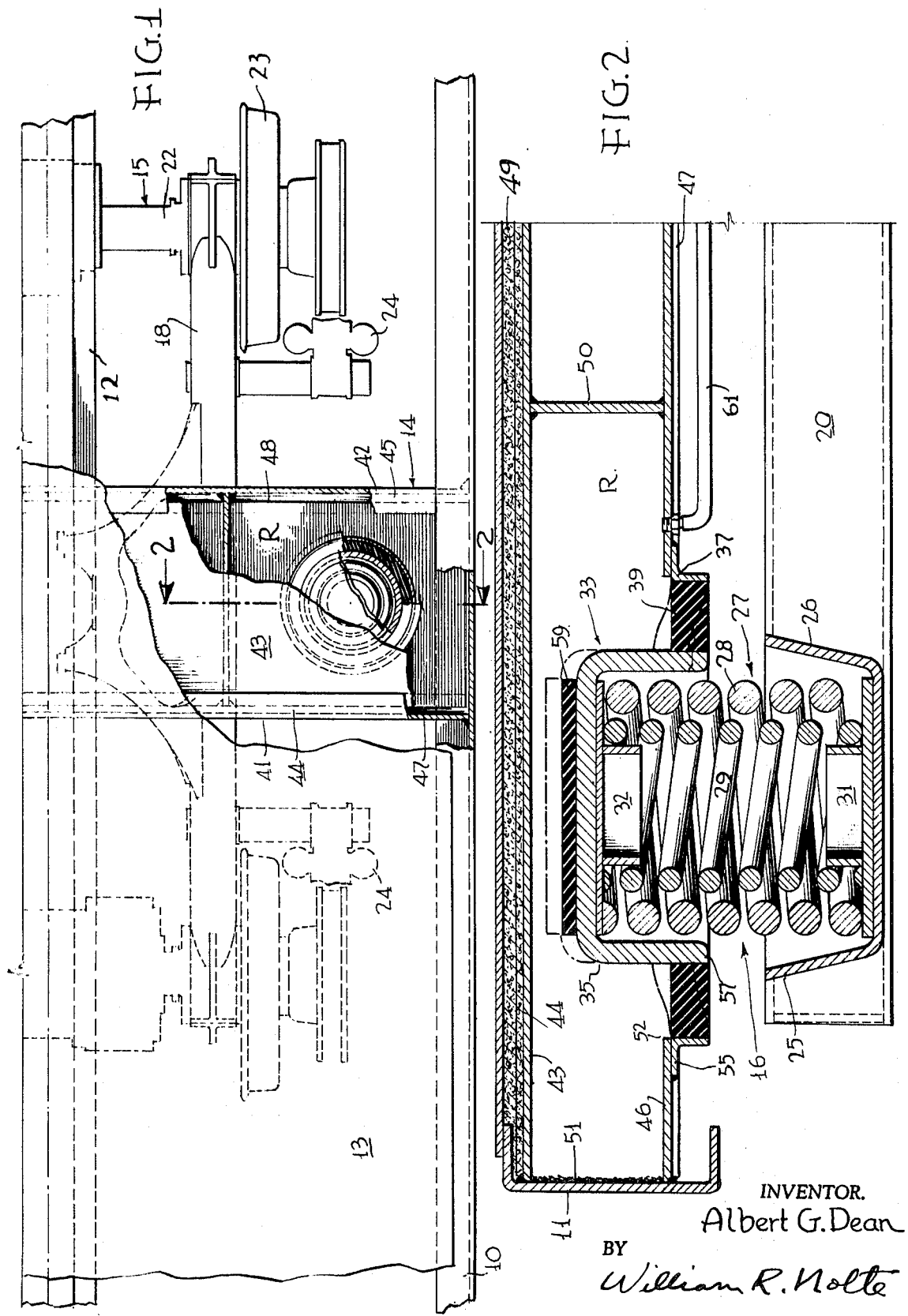
INVENTOR.
Albert G. Dean
BY
William R. Nolte
AGENT

COMPOUND RAILWAY SPRING ASSEMBLY

Reference is made to applicant's copending application Ser. No. 795,218, filed Jan. 30, 1969, entitled "Spring Apparatus" and assigned to the same assignee as the present invention. This copending application discloses two axially aligned cylinders connected by an elastomer ring which provides an air seal between the cylinders and which is arranged in series with a coil spring to support a vehicle body above a truck. The two axially aligned cuplike cylinders enclose a given volume of air. The amount of air entrapped between the cylinders is a function of their size. One difficulty with this construction is that air must be supplied through one of the other of the cylinders. In addition certain limitations and problems are encountered due to the manner of moulding the rubber ring to the two cup members.

It is an object of this invention to provide an improved pneumatic air spring apparatus which avoids one or more of the disadvantages of the prior art arrangements and which is of simplified construction.

In accordance with the invention, the pneumatic spring apparatus of the present invention comprises a cup-shaped housing with elastomer ring means bonded to the housing and an outer securing ring. The housing and elastomer ring means seal an opening in an air reservoir formed by the bolster structure of the car body. Coil spring means disposed in series with the pneumatic air spring means support the car body above the truck of the vehicle.

For a better understanding of the present invention together with other and further objects thereof, reference is had to the following description taken in connection with the accompanying drawings.

In the drawings,

FIG. 1 is a top plan view of the spring apparatus of the present invention showing the same positioned between a vehicle car body and its trucks;

FIG. 2 is a sectional view taken through the spring apparatus along the lines 2—2 of FIG. 1.

A portion of a vehicle body 10 having a side sill 11, a center sill 12, a floor 13, and a car body bolster 14 is supported above truck 15 means of spring apparatus 16 of the present invention. The truck 15 may be of the type described in U.S. Pat. No. 2,908,230 and is shown as including a side frame member 18, supporting a transverse truck bolster 20. The side frames support at their opposite ends axles 22 which carry wheels 23. A brake assembly 24 is provided for each of the wheels. The outer side end portions of the truck bolster include an opening 25 into which is received a lower coil spring support 26. The latter supports vertically disposed coil spring means 27 which include a heavy outer coil spring 28 and an inner light coil spring 29 coaxially nested with the heavy outer spring. The lower ends of both coil springs 28, 29 rest upon a lower core-flanged positioning plate 31. A like upper core-flange positioning plate 32 rests on top of the coil springs 28, 29 and carries improved pneumatic spring means 33 in straight series arrangement with the coil spring assembly 27 therebeneath.

The improved pneumatic spring means comprises a cuplike housing means 35, an outer flanged ring member 37, which sandwich therebetweeen elastomer ring means 39. The cup housing 35, flanged ring member 37 and the elastomer ring means 39, cooperate with the body bolster 14 of the vehicle to form an air reservoir R. As seen in FIG. 3 the body bolster 14 includes a pair of spaced apart transverse channel members 41, 42. An upper plate 43 bridges the top flanges 44, 45 of channel members 41, 42 respectively, while a lower plate 46 is suitably welded to the lower flanges 47, 48 respectively of the channel members. A suitable insulation layer 49 is interposed between top plate 43 and floor 13 of the car body. An end plate 50 connected to the top and bottom plates 43, 46, and to the vertical webs of the channel members 41 and 42 is effective to seal off the inner end of the reservoir. The outboard edges of plates 43, 46, as well as channel member 41, 42 are likewise welded to the inside face 51 of side sill 11.

The bottom plate 46 includes a circular opening 52 which in size is slightly less in diameter than the outer diameter of elastomer ring 39. The flanged ring member 37 is angle-shaped in cross section and its vertical flange 54 is suitably bonded to the outer periphery of the elastomer. The horizontal flange 55 is secured to the under surface of lower plate 46. The inner periphery of the elastomer ring 39 is bonded to the lower outer marginal surface of the downwardly depending flange wall 57 of the cup shaped member 35. The lower edge of the flange wall 57 is at approximately midheight of the coil springs 28, 29. As observed the cup-shaped member 35 extends up within the reservoir, and under a working load as the vehicle is in motion, the cup member and the elastomer ring 39 function as a piston within the reservoir to cushion the shock between the vehicle body and the truck below. A resilient bumper pad 59 is carried by the top surface of the cup 35 and is effective to limit the extent of upward travel of the cup member. The reservoir R is provided with an air supply which may be by means of a rigid pipe connection 61 tapped into the lower plate 46 to control the elevation of the car body above the truck. In this manner drilling of the cup member to provide an air supply adjacent the coil springs 28, 29 is avoided.

With further reference now to the elastomer ring means 39 it is noted that the same is of a material composition which will yield more readily in a vertical direction corresponding to the axis of the coil springs 28, 29 than in a direction transverse thereto. The ring member 39 thus has the property of being substantially incompressible as a result of loads being applied in the plane of the lower plate 46 of the reservoir R. Thus under lateral action or movement of the car body 10 relative to the truck bolster 20 the dimensions of the elastomer ring in a horizontal plane remain fairly stable, and such lateral action of the car body is taken in lateral deflection of the coil springs 28, 29.

While there has been described what at present is considered to be the preferred embodiment of this invention, it will be obvious to those skilled in the art that various changes and modifications may be made therein without departing from the invention and it is aimed therefor in the appended claims to cover all such changes and modifications as fall within the true spirit and scope of the invention.

I claim:

1. In a railway vehicle having a body bolster supported by spring means on the bolster of a railway truck, said body bolster defining air reservoir means with bottom plate means having an opening therein, comprising, cup means disposed within said opening, said cup means having a top wall and a downwardly extending sidewall with a lower edge portion adjacent the margins of said opening in said bottom plate means, coil spring means disposed along a vertical axis between said body bolster and said truck bolster and including a top portion received in said cup means and a bottom portion supported by said truck bolster, elastomer ring means secured to said sidewall of said cup means adjacent its lower edge, means securing said elastomer ring means to said bottom plate means to seal said opening, said elastomer ring means having a property of being relatively flexible in a vertical direction to enable said cup means to function as a piston in said reservoir, said elastomer ring means being relatively incompressible in a direction transverse to said vertical axis, leaving lateral movement between the bottom plate means of said body bolster and the bolster of the truck to be taken in lateral deflection by said coil spring means.

2. In the railway vehicle as set forth in claim 1 wherein the lower edge portion of said downwardly extending sidewall portion of said cup means terminates adjacent the mid portion of said coil spring means, 3. In the railway vehicle as set forth in claim 2 wherein said means securing said elastomer ring means to said bottom plate means include a ring member secured to the outer periphery of said elastomer ring means and to the margins of said opening in said bottom plate means.